Jan. 31, 1939.　　　O. HOLM-HANSEN　　　2,145,723
CORD HOOK
Filed Dec. 2, 1937
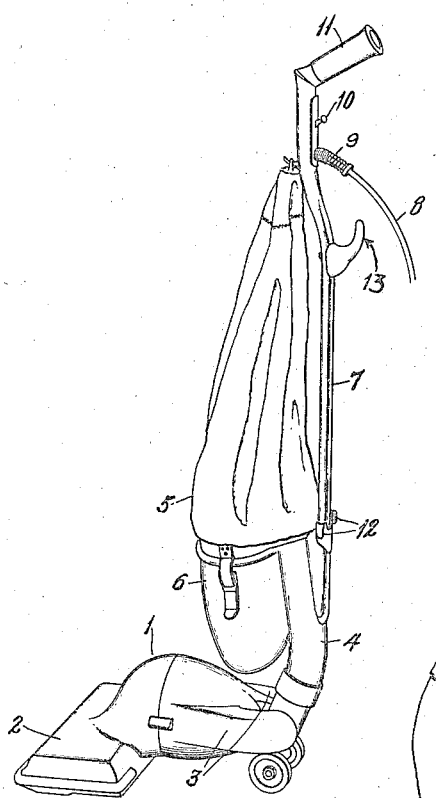
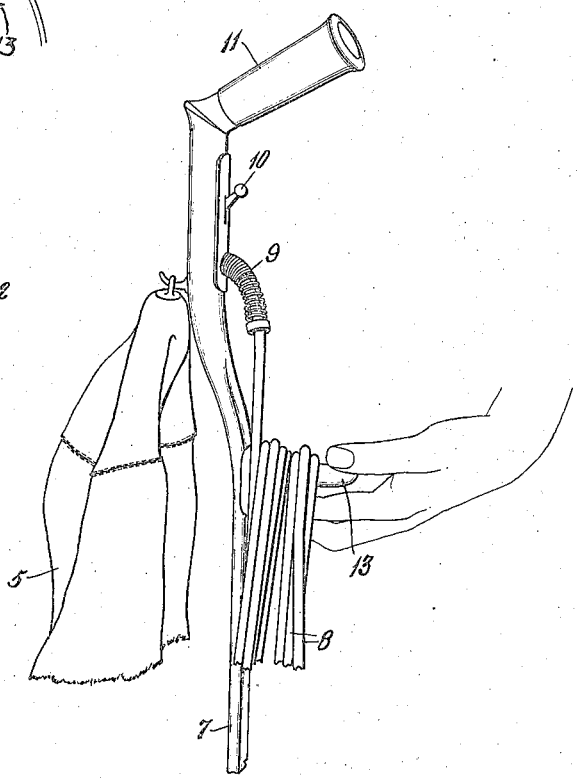
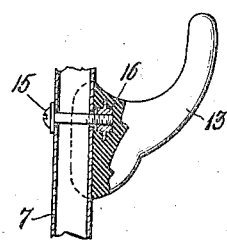
Inventor:
Osmund Holm-Hansen,
by Harry E. Dunham
His Attorney.

Patented Jan. 31, 1939

2,145,723

UNITED STATES PATENT OFFICE 2,145,723

CORD HOOK

Osmund Holm-Hansen, Stratford, Conn., assignor to General Electric Company, a corporation of New York Application December 2, 1937, Serial No. 177,751

1 Claim. (Cl. 242—85)

The present invention relates to cord hooks over which a conductor cord may be coiled. One use of such cord hooks is in devices such as vacuum cleaners in which the cord hooks are mounted on the handle of the cleaner.

The object of my invention is to provide an improved construction and arrangement in cord hooks, and for a consideration of what I believe to be novel and my invention, attention is directed to the following description and the claim appended thereto.

In the accompanying drawing, Fig. 1 is a perspective view of a vacuum cleaner equipped with a cord hook embodying my invention; Fig. 2 is a detailed view of the cord hook, partly in section to show the manner of attaching the cord hook to the vacuum cleaner handle; and Fig. 3 is a view illustrating the use of the cord hook.

Referring to the drawing, I have shown my invention applied to a vacuum cleaner having a casing 1 provided at the front with a suction nozzle 2 through which air is drawn by an electric motor driven fan mounted in the casing. The air is discharged through forked outlets 3 to a conduit 4 pivoted therebetween. The conduit 4 discharges in the lower end of a bag 5 suspended from the handle. A removable receptacle 6 is provided at the lower end of the bag into which the dirt settles. The conduit 4, the bag and the receptacle are carried by a handle 7. Power is supplied to the vacuum cleaner through a conductor cord 8 which enters the upper end of the handle through a strain relief 9 and extends downwardly through the handle to make suitable connections with the electric motor within the casing 1. The circuit to the electric motor is controlled by a switch 10 mounted adjacent the grip 11.

At the lower end of the handle is fixed rigid downwardly facing metal cord hooks 12. At the upper end of the handle is a cord hook 13 of rubber or other resilient material. The hook is secured to the handle by a screw 15 threaded into a nut 16 embedded in the handle.

When the vacuum cleaner is not in use the conductor cord is coiled on the cord hooks. By flexing the cord hook 13 to the position shown in Fig. 3, one or more loops of the coiled conductor cord can be removed therefrom without uncoiling. After removal from the cord hook 13, the loops of the conductor cord will drop clear of the lower cord hooks 12. The above described construction permits all or any part of the conductor cord to be easily and quickly removed. When released, the cord hook 13 returns to the position shown in Fig. 1. In this position, it has sufficient strength to support the cord coiled thereon.

What I claim as new and desire to secure by Letters Patent of the United States, is:

In combination with electrical apparatus, a supply cord and hook-shaped supports for winding said supply cord thereon in a plurality of loops, at least one of said supports being of resilient rubber-like material rigidly mounted on said apparatus and being of sufficient stiffness to normally support said loops, said resilient support being capable of being flexed to a position permitting the removal of loops of the cord from said resilient support without uncoiling.

OSMUND HOLM-HANSEN.